(12) United States Patent
Chiou

(10) Patent No.: US 7,342,974 B2
(45) Date of Patent: Mar. 11, 2008

(54) CHANNEL ESTIMATION IN OFDM SYSTEMS

(75) Inventor: Rong-Liang Chiou, Taipei (TW)

(73) Assignee: Silicon Integrated Systems Corp., Hsin chu (TW)

( * ) Notice: Subject to any disclaimer, the term of this patent is extended or adjusted under 35 U.S.C. 154(b) by 1240 days.

(21) Appl. No.: 10/391,742

(22) Filed: Mar. 20, 2003

(65) Prior Publication Data

US 2004/0184399 A1    Sep. 23, 2004

(51) Int. Cl.
*H04K 1/10* (2006.01)
*H04L 27/28* (2006.01)

(52) U.S. Cl. .......... 375/260; 375/346; 375/231; 375/232; 375/285; 375/350

(58) Field of Classification Search .......... 375/260, 375/346, 350, 232, 231, 233, 285, 259
See application file for complete search history.

(56) References Cited

U.S. PATENT DOCUMENTS

| | | | |
|---|---|---|---|
| 6,188,717 B1 * | 2/2001 | Kaiser et al. | 375/148 |
| 6,765,969 B1 * | 7/2004 | Vook et al. | 375/259 |
| 7,099,299 B2 * | 8/2006 | Liang et al. | 370/342 |
| 7,149,239 B2 * | 12/2006 | Hudson | 375/144 |
| 7,242,721 B2 * | 7/2007 | Alard et al. | 375/260 |
| 2002/0176485 A1 * | 11/2002 | Hudson | 375/144 |

FOREIGN PATENT DOCUMENTS

CN    1286544 A    3/2001

OTHER PUBLICATIONS

Bo Al et al., "Channel Estimation Algorithm for COFDM System", 1001-893X(2002)06-0061-06, year 2002.

* cited by examiner

*Primary Examiner*—Phuong Phu
(74) *Attorney, Agent, or Firm*—Birch, Stewart, Kolasch & Birch, LLP

(57) ABSTRACT

A method for estimating channels of an OFDM signal. The method comprises the steps of deriving responses of pilot channels, deriving responses of first data channels by time and frequency domain combined linear interpolation among the responses of the pilot channels, deriving each response of boundary channels by frequency domain linear interpolation between the responses of the nearest pilot and first data channels, and deriving responses of second data channels by frequency domain extrapolation using the responses of the pilot and first data channels.

18 Claims, 4 Drawing Sheets

CHANNEL ESTIMATION IN OFDM SYSTEMS

BACKGROUND OF THE INVENTION

1. Field of the Invention

The present invention relates to orthogonal frequency division multiplexing (OFDM) and particularly to an OFDM receiver with a channel estimator using 2-dimensional interpolation.

2. Description of the Prior Art

OFDM is a multi-channel modulation system employing Frequency Division Multiplexing (FDM) of orthogonal sub-carriers, each modulating a low bit-rate digital stream.

In older multi-channel systems using FDM, the total available bandwidth is divided into N non-overlapping frequency sub-channels. Each sub-channel is modulated with a separate symbol stream and the N sub-channels are frequency multiplexed. Even though the prevention of spectral overlapping of sub-carriers reduces (or eliminates) Inter-channel Interference, this leads to an inefficient use of spectrum. The guard bands on either side of each sub-channel waste precious bandwidth. To overcome the problem of bandwidth wastage, alternatively, N overlapping (but orthogonal) sub-carriers, each carrying a baud rate of 1/T and spaced 1/T apart can be used. Because of the frequency spacing selected, the sub-carriers are all mathematically orthogonal to each other. This permits the proper demodulation of the symbol streams without requiring non-overlapping spectra. Another way of specifying the sub-carrier orthogonality is to require that each sub-carrier have an exact integer number of cycles in the interval T. The modulation of these orthogonal sub-carriers can be represented as an Inverse Fourier Transform. Alternatively, a DFT operation followed by low-pass filtering can generate the OFDM signal. It must be noted that OFDM can be used either as a modulation or multiplexing technique.

The use of Discrete Fourier Transform (DFT) in the parallel transmission of data using Frequency Division Multiplexing was investigated in 1971 by Weinstein and Ebert. In a data sequence $d_0, d_2, \ldots, d_{N-1}$, where each $d_n$ is a complex symbol (the data sequence can be the output of a complex digital modulator, such as QAM, PSK etc), when performing an IDFT on the sequence 2dn (the factor 2 is used purely for scaling purposes), N complex numbers Sm (m=0,1 . . . , N−1) result, as:

$$S_m = 2\sum_{n=0}^{N-1} d_n \exp\left(j2\pi\frac{nm}{N}\right) \quad (2.1)$$

$$= 2\sum_{n=0}^{N-1} d_n \exp(j2\pi f_n t_m) \quad [m = 0, 1, \ldots N-1]$$

Where, $$f_n = \frac{n}{NT_s} \text{ and } t_m = mT_s \quad (2.2)$$

Where, $T_s$ represents the symbol interval of the original symbols. Passing the real part of the symbol sequence represented by equation (2.1) thorough a low-pass filter with each symbol separated by a duration of $T_s$ seconds, yields the signal, $$y(t) = 2\text{Re}\left\{\sum_{n=0}^{N-1} d_n \exp\left(j2\pi\frac{n}{T}t\right)\right\}, \text{ for } 0 \leq t \leq T \quad (2.3)$$

Where T is defined as $NT_s$. The signal y(t) represents the baseband version of the OFDM signal.

It can be noted from (2.3) that the length of the OFDM signal is T, the spacing between the carriers is equal to 1/T, the OFDM symbol-rate is N times the original baud rate, there are N orthogonal sub-carriers in the system, and the signal defined in equation (2.3) is the basic OFDM symbol.

One of the main advantages of OFDM is its effectiveness against the multi-path delay spread frequently encountered in mobile communication channels. The reduction of the symbol rate by N times results in a proportional reduction of the relative multi-path delay spread, relative to the symbol time. To completely eliminate even the very small ISI that results, a guard time is introduced for each OFDM symbol. The guard time must be chosen to be larger than the expected delay spread, such that multi-path components from one symbol cannot interfere with the next symbol. Leaving the guard time empty may lead to inter-carrier interference (ICI), since the carriers are no longer orthogonal to each other. To avoid such crosstalk between sub-carriers, the OFDM symbol is cyclically extended in the guard time. This ensures that the delayed replicas of the OFDM symbols always have an integer number of cycles within the FFT interval as long as the multi-path delay spread is less than the guard time.

If the ODFM symbol is generated using equation (2.3), the power spectral density of this signal is similar to that shown in FIG. 4. The sharp-phase transitions caused by phase modulation result in very large side-lobes in the PSD and the spectrum falls off rather slowly (according to a sinc function). If the number of sub-carriers increases, the spectrum roll-off is sharper in the beginning, but moves further away at frequencies from the 3-dB cut-off frequency. To overcome this problem of slow spectrum roll-off, a windowing may be used to reduce the side-lobe level. The most commonly used window is the Raised Cosine Window given by:

$$w(t) = \begin{cases} 0.5 + 0.5\cos(\pi + \pi t/(\beta T_r)), & \ldots 0 \leq t \leq \beta T_r \\ 1.0, & \ldots \beta T_r \leq t \leq T_r \\ 0.5 + 0.5\cos((t-T_r)\pi/\beta T_r)), & \ldots T_r \leq t \leq (1+\beta)T_r \end{cases}$$

Here $T_r$ is the symbol interval chosen to be shorter than the actual OFDM symbol duration, since the symbols are allowed to partially overlap in the roll-off region of the raised cosine window. Incorporating the windowing effect, the OFDM symbol can now be represented as:

$$y(t) = 2\text{Re}\left\{w(t)\sum_{n=0}^{N-1} d_n \exp\left(j2\pi\frac{n}{T}t\right)\right\}, \text{ for } 0 \leq t \leq T$$

It must be noted that filtering can also be used as a substitute for windowing, for tailoring the spectrum roll-off. Windowing, though, is preferred to filtering because it can be carefully controlled. With filtering, rippling effects in the roll-off region of the OFDM symbol must be avoided. Rippling causes distortions in the OFDM symbol, which directly leads to less-delay spread tolerance.

Based on the previous discussions, the method for generating an ODFM symbol is as follows.

First, the $N_s$ input complex symbols are padded with zeros to get N symbols to calculate the IFFT. The output of the IFFT is the basic OFDM symbol.

Based on the delay spread of the multi-path channel, a specific guard-time must be chosen (e.g. $T_g$). A number of samples corresponding to this guard time must be taken from the beginning of the OFDM symbol and appended to the end of the symbol. Likewise, the same number of samples must be taken from the end of the OFDM symbol and inserted at the beginning.

The OFDM symbol must be multiplied by the raised cosine window to remove the power of the out-of-band sub-carriers.

The windowed OFDM symbol is then added to the output of the previous OFDM symbol with a delay of $T_r$, so that there is an overlap region of $\beta T_r$ between each symbol.

OFDM system design, as in any other system design, involves tradeoff and conflicting requirements. The following are the most important design parameters of an OFDM system and may form part of a general OFDM system specification: Bit Rate required for the system, Bandwidth available, BER requirements (Power efficiency) and RMS delay spread of the channel.

Guard Time

Guard time in an OFDM system usually results in an SNR loss in an OFDM system, since it carries no information. The choice of the guard time is straightforward once the multi-path delay spread is known. As a rule of thumb, the guard time must be at least 2-4 times the RMS delay spread of the multi-path channel. Further, higher-order modulation schemes (like 32 or 64 QAM) are more sensitive to ISI and ICI than simple schemes like QPSK. This factor must also be taken into account when determining the guard-time.

Symbol Duration

To minimize SNR loss due to guard time, symbol duration must be set much higher than guard time. An increase in symbol time, however, implies a corresponding increase in the number of sub-carriers and thus an increase in the system complexity. A practical design choice for symbol time requires at least five times the guard time, which leads to an acceptable SNR loss.

Number of Sub-Carriers

Once the symbol duration is determined, the number of sub-carriers required can be determined by first calculating the sub-carrier spacing buy simply inverting the symbol time (less the guard period). The number of sub-carriers is the available bandwidth divided by the sub-carrier spacing.

Modulation and Coding Choices

The first step in selecting coding and modulation techniques is to determine the number of bits carried by an OFDM symbol. Then, a suitable combination of modulation and coding techniques can be selected to fit the input data rate into the OFDM symbols and, at the same time, satisfying the bit-error rate requirements. Selection of modulation and coding techniques is now simplified, since each channel is assumed to almost AWGN and there is no requirement for consideration of the effects of multi-path delay spread.

OFDM possesses inherent advantages for wireless communications.

As discussed earlier, the increase in the symbol time of the OFDM symbol by N times (N being the number of sub-carriers), leads to a corresponding increase in the effectiveness of OFDM against the ISI caused due to multi-path delay spread. Further, use of the cyclic extension process and proper design can completely eliminate ISI from the system.

In addition to delay variations in the channel, the lack of amplitude flatness in the frequency response of the channel also causes ISI in digital communication systems. A typical example would be twister-pair cable use in telephone lines. These transmission lines handle voice calls and have a poor frequency response when it comes to high frequency transmission. In systems that use single-carrier transmission, an equalizer may be required to mitigate the effect of channel distortion. The complexity of the equalizer depends upon the severity of the channel distortion and there are frequently issues such as equalizer non-linearities and error propagation etc., that cause additional trouble.

In OFDM systems, on the other hand, since the bandwidth of each sub-carrier is very small, the amplitude response over this narrow bandwidth will be basically flat (of course, it can be safely assumed that the phase response will be linear over this narrow bandwidth). Even in the case of extreme amplitude distortion, an equalizer of very simple structure will be enough to correct the distortion in each sub-carrier.

The use of sub-carrier modulation improves the flexibility of OFDM to channel fading and distortion makes it possible for the system to transmit at maximum possible capacity using the technique of channel loading. If the transmission channel has a fading notch in a certain frequency range corresponding to a certain sub-carrier, the presence of this notch can be detected using channel estimation schemes, and assuming that the notch does not vary fast enough compared to the symbol duration of the OFDM symbol, it is possible to change (scale down/up) the modulation and coding schemes for this particular sub-carrier (i.e., increase their robustness against noise), so that capacity as a whole is maximized over all the sub-carriers. However, this requires the data from channel-estimation algorithms. In the case of single-carrier systems, nothing can be performed against such fading notches. They must somehow survive the distortion using error correction coding or equalizers.

Impulse noise usually comprises a burst of interference in channels such as the return path HFC (Hybrid-Fiber-Coaxial), twisted-pair and wireless channels affected by atmospheric phenomena such as lightning etc. It is common for the length of the interference waveform to exceed the symbol duration of a typical digital communication system. For example, in a 10 MBPS system, the symbol duration is 0.1 μs, and an impulse noise waveform, lasting for a couple of micro-seconds, can cause a burst of errors that cannot be corrected using normal error-correction coding. Usually complicated Reed-Solomon codes in conjunction with huge interleaves are used to correct this problem. OFDM systems are inherently robust against impulse noise, since the symbol duration of an OFDM signal is much larger than that of the corresponding single-carrier system and thus, it is less likely that impulse noise will cause (even single) symbol errors. Thus, complicated error-control coding and interleaving schemes for handling burst-type errors are not really required for OFDM Systems simplifying the transceiver design.

OFDM is the best environment in which to employ frequency diversity. In fact, in a combination of OFDM and CDMA, called MC-CDMA transmission, frequency diversity is inherently present in the system (i.e., it is freely available). Even though OFDM provides advantages for wireless transmission, it has a few serious disadvantages that must be overcome for this technology to become a success.

Many applications that use OFDM technology have arisen in the last few years. In the following, one such application, DVB-T, is described in detail.

Digital Video Broadcasting (DVB) is a standard for broadcasting Digital Television over satellite, cable, and terrestrial (wireless) transmission.

DVB-T has two modes of operation, a 2 k mode with 1705 sub-carriers and 8 k modes with 6817 sub-carriers. DVB-T uses QPSK, 16-QAM or 64-QAM mapping for modulation, and uses a Reed-Solomon outer code (204, 188, t=8) and an outer convolutional interleaving. Besides, an inner convolutional code with generator polynomials (171,133 octal) combined with two layers of interleaving for error-control is used. Such OFDM system with coding also names as COFDM. Finally, pilot sub-carriers obtain reference amplitudes and phases for coherent demodulation. Two-dimensional channel estimation is performed using the pilot sub-carriers, which aids in the mobile reception of the OFDM signal.

The 2 k mode is suitable for single-transmitter operation and for relatively small single-frequency networks with limited transmitter power. The 8 k mode can be used both for single-transmitter operation and for large-area single-frequency networks.

Improved multi-path immunity is obtained through the use of a guard interval, a portion of the digital signal given away for echo resistance. This guard interval, which length is selectable, reduces the transmission capacity of OFDM systems. However, the greater the number of OFDM carriers provided, for a given maximum echo time delay, the less transmission capacity is lost. Nonetheless, a tradeoff is involved. Simply increasing the number of carriers has a significantly detrimental impact on receiver complexity and phase-noise sensitivity.

Because of the multi-path immunity of OFDM, it may be possible to operate an overlapping network of transmitting stations with a single frequency. In the areas of overlap, the weaker of the two received signals is similar to an echo signal. However, if the two transmitters are far apart, causing a large time delay between the two signals, the system will require a large guard interval.

The potential exists for three different operating environments for digital terrestrial television in Europe, including broadcast on a currently unused channel, such as an adjacent channel, or on a clear channel; broadcast in a small-area single-frequency network (SFN); or broadcast in a large-area SFN.

One of the main challenges for the DVB-T developers is that the different operating environments lead to somewhat different optimum OFDM systems. The common 2 k/8 k specification has been developed to offer solutions for all (or nearly all) operating environments.

As previously described, in the OFDM receiver to which the present invention particularly relates, a dynamic estimation of channel is necessary before the demodulation of OFDM signals since the radio channel is frequency selective and time-variant for wideband mobile communication systems.

The channel estimation can be performed by either inserting pilot tones into all of the sub-carriers of OFDM symbols with a specific period or inserting pilot tones into each OFDM symbol. The first method, block type pilot channel estimation, has been developed under the assumption of slow fading channel. Even with decision feedback equalizer, this assumes that the channel transfer function does not change very rapidly. The estimation of the channel for this block-type pilot arrangement can be based on Least Square (LS) or Minimum Mean-Square (MMSE). The MMSE estimate has been shown to give 10-15 dB gain in signal-to-noise ratio (SNR) for the same mean square error of channel estimation over LS estimate. The second, the comb-type pilot channel estimation, has been introduced to satisfy the need for equalizing when the channel changes even from one OFDM block to the subsequent block. The comb-type pilot channel estimation consists of algorithms to estimate the channel at pilot frequencies and to interpolate the channel.

U.S. Pat. No. 6,298,035 discloses a method and apparatus for estimating separate channel frequency responses for two channels in an orthogonal frequency division multiplexing system with two transmitters. The channel frequency responses are estimated using specifically selected training symbols that are broadcast from the two transmitters. The training symbols are specifically selected so as to improve the estimation of the channel frequency responses for each channel, while requiring the same amount of training symbols as in an estimation of the channel frequency response of a single channel.

U.S. Pat. No. 6,473,393 discloses channel estimation for OFDM systems with transmitter diversity. In a receiver that includes a plurality of receiving antennas that supply signals to associated OFDM receiving modules, and the receiving modules provide signals that are applied to a detector, channel parameters needed for proper detection are estimated during normal operation, in addition to an initial estimate based on a known training sequence. In computing the channel impulse response estimates between the signal received at that receiving antenna and the various transmitting antennas, an $nK_0 \times nK_0$ matrix of terms ($q_{x,y}$ [1]) is developed. The inverse of the matrix is then computed, and the computed matrix inverse is multiplied by a vector of terms ($p_i$ [1]), to obtain a vector of $nK_0$-sample channel impulse response estimates.

U.S. Pat. No. 6,487,253 discloses systems and methods for estimating channel response in the presence of interference. Interference and/or noise present on received training symbols is estimated. Based on the measured noise and/or interference, a weighting among training symbols is developed. Channel response is then estimated based on a weighted least squares procedure.

However, the estimation methods described previously are 1-dimensional. That is to say, the channels are estimated by interpolation between pilots only in frequency domain. The channels are time-varied as well as frequency selective. The 1-D interpolation in frequency domain does not reflect the variety of the channels in time domain. An OFDM receiver with a 1-dimensional channel estimator is not suitable for mobile reception.

SUMMARY OF THE INVENTION

The object of the present invention is to provide an OFDM receiver, a method for processing a RF OFDM signal from an OFDM transmitter, and particularly a channel estimation method for an OFDM receiver, all of which are suitable for mobile reception.

The present invention provides a method for processing a RF OFDM signal transmitted from an OFDM transmitter, comprising the steps of receiving and converting the RF OFDM signal into an IF OFDM signal, mixing down and synchronizing the IF OFDM signal to a baseband OFDM signal, removing cyclic prefix in the baseband OFDM signal, implementing FFT of the baseband OFDM signal wherein the cyclic prefix is removed, estimating channels of and equalizing the OFDM signal after FFT, applying channel decoding to the equalized OFDM signal, and removing energy dispersal of the OFDM signal after the channel decoding, wherein the channel estimation and equalization comprises the steps of deriving responses of pilot channels, deriving responses of first data channels by time and frequency domain combined linear interpolation among the responses of the pilot channels, deriving each response of boundary channels by frequency domain linear interpolation between the responses of the nearest pilot and first data channels, deriving responses of second data channels by frequency domain extrapolation using the responses of the pilot and first data channels, and equalizing sub-carriers by the responses of all the channels.

The present invention provides a method for estimating channels of an OFDM signal comprising the steps of deriving responses of pilot channels, deriving responses of first data channels by time and frequency domain combined linear interpolation among the responses of the pilot channels, deriving each response of boundary channels by frequency domain linear interpolation between the responses of the nearest pilot and first data channels, and deriving responses of second data channels by frequency domain extrapolation using the responses of the pilot and first data channels.

The present invention also provides an OFDM receiver including an antenna receiving a RF OFDM signal, a RF tuner converting the RF OFDM signal into an IF OFDM signal, a digital mixer mixing down the IF OFDM signal to a baseband OFDM signal, a cyclic prefix removing circuit removing cyclic prefix in the baseband OFDM signal, a coarse synchronizer coupled between the cyclic prefix removing circuit and the digital mixer, an FFT processor implementing FFT of the baseband OFDM signal wherein the cyclic prefix is removed, a fine synchronizer coupled between the FFT processor and the digital mixer, a channel estimator and equalizer receiving the OFDM signal from the FFT processor, a channel decoder applying channel decoding to the OFDM signal output from the channel estimator and equalizer, and an energy dispersal removing circuit removing energy dispersal of the OFDM signal output from the channel decoder, wherein the channel estimator and equalizer include means for deriving responses of pilot channels, means for deriving responses of first data channels by time and frequency domain combined linear interpolation among the responses of the pilot channels, means for deriving each response of boundary channels by frequency domain linear interpolation between the responses of the nearest pilot and first data channels, means for deriving responses of second data channels by frequency domain extrapolation using the responses of the pilot and first data channels, and means for equalizing sub-carriers by the responses of all the channels.

The present invention further provides a channel estimator in an OFDM receiver including means for deriving responses of pilot channels, means for deriving responses of first data channels by time and frequency domain combined linear interpolation among the responses of the pilot channels, means for deriving each response of boundary channels by frequency domain linear interpolation between the responses of the nearest pilot and first data channels, and means for deriving responses of second data channels by frequency domain extrapolation using the responses of the pilot and first data channels.

Thus, the 2-dimensional channel estimation in the present invention takes the channel variety in time domain into consideration. The OFDM receiver with such a channel estimator is suitable for both indoor and mobile reception.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
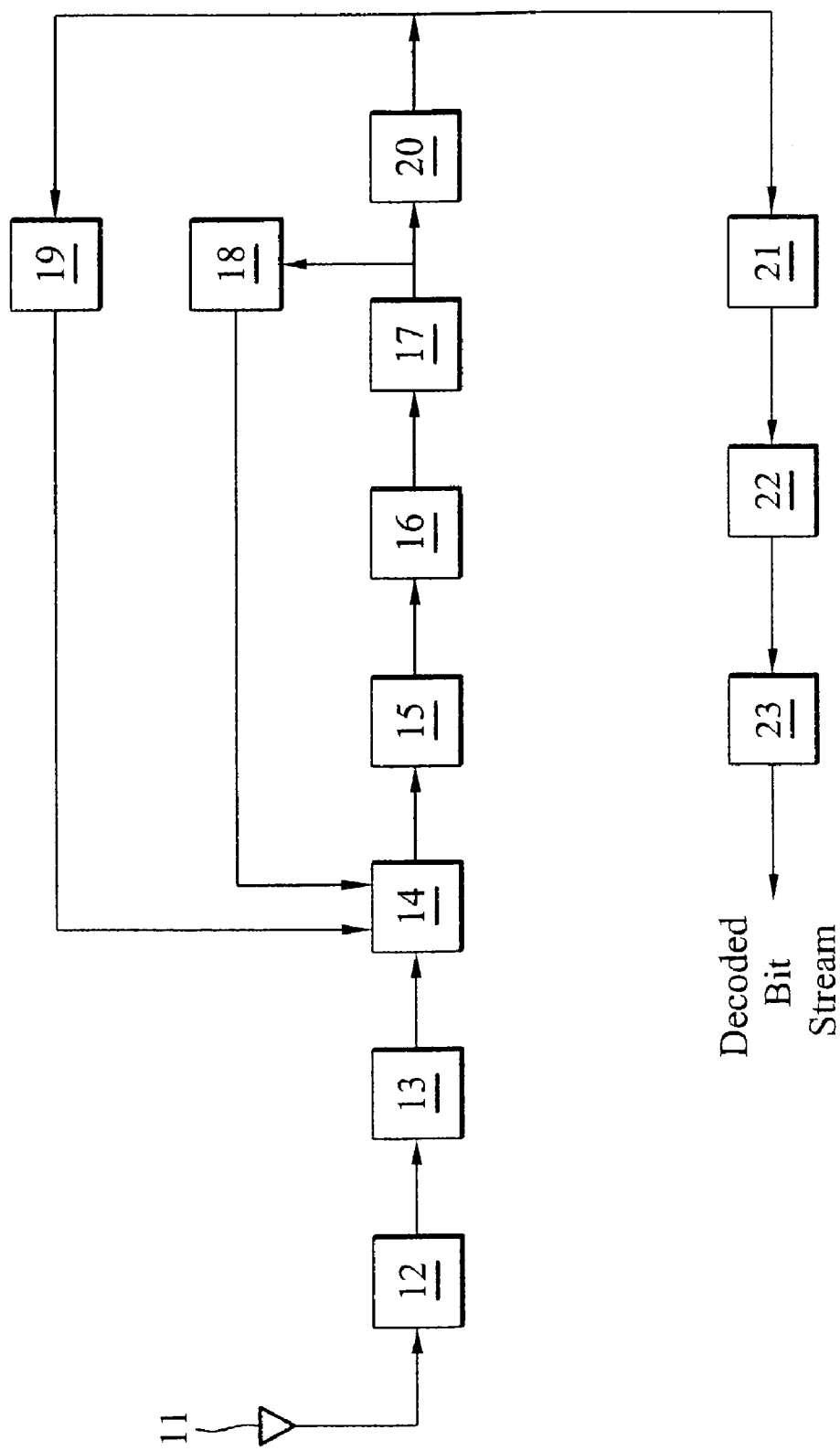
FIG. 1 is a functional block diagram of an OFDM receiver according to one embodiment of the invention.

FIG. 1 is a functional block diagram of an OFDM receiver according to one embodiment of the invention. The OFDM receiver 1 includes an antenna 11, RF tuner 12, A/D converter 13, digital mixer 14, low-pass filter 15, interpolation filter 16, cyclic prefix remover 17, coarse synchronizer 18, fine synchronizer 19, FFT processor 20, channel estimator and equalizer 21, channel decoder 22 and energy dispersal removing circuit 23. The OFDM receiver 1 outputs a decoded bit stream of the OFDM signal.

The antenna 11 receives a radio frequency (RF) signal from an OFDM transmitter (not shown). The RF signal received by the antenna 11 is an OFDM modulated signal carrying OFDM symbols. The OFDM receiver 1 performs a receiving process for the OFDM symbols. The OFDM symbols are, for example, a synchronous symbol, a delay time estimating symbol, a channel frequency response calculating symbol (pilots), and a data symbol.

The RF tuner 12 converts the received RF input signal in frequency to an intermediate frequency band (IF) signal, amplifies it, and applies it to the A/D converter 13. The digital signal from the A/D converter is sent to the digital mixer (multipliers) 14. The digital signal is then combined, in the digital mixer 14, with a frequency signal from a local oscillator (not shown) to be mixed down to baseband.

The combined signal from the digital mixer 14 has signal components centered at 0 Hz and a high frequency twice the carrier frequency. The low-pass filter 15 removes the signal components at the high frequency.

Because the sampling clock difference between the transmitter and receiver, each signal sample deviates from its correct sampling time by a small amount, linearly increased with the index of the sample. For example, 100 ppm crystal offset, will deviate by 1 sample after 10000 samples. If a symbol contains 100 samples, then within each symbol the maximum offset will be 1%. Although this may cause orthogonal degradation between the sub-carriers, it can usually be ignored. If sampling error must be corrected, then the interpolation filter 16 must be used to construct the signal at the correct sampling time.

The cyclic prefix in the OFDM signal is removed by the cyclic prefix remover 17 before implementation of FFT. The cyclic prefix completely eliminates the inter-symbolic interference. A guard time is chosen, larger than the expected delay spread such that multi-path components from one symbol cannot interfere with the next symbol, wherein the cyclic prefix is located. This guard time could be no signal at all but the problem of inter-carrier interference (ICI)

arises. Then, the OFDM symbol is cyclically extended in the guard time. Using this method, the delay replicas of the OFDM symbol always have an integer number of cycles within the FFT interval, as long as the delay is smaller than the guard time. Multi-path signals with delays smaller than the guard time cannot cause ICI.

After removing cyclic prefix, the signal is sent to the coarse synchronizer 18 which forms a feedback loop between the digital mixer 14 and the cyclic prefix remover 17. Moreover, after implementation of FFT, the signal is sent to the fine synchronizer 19 which forms a feedback loop between the digital mixer 14 and the FFT processor 20.

Synchronization is a major hurdle in OFDM.

Synchronization usually consists of frame detection, carrier frequency offset estimation and correction, or sampling error correction.

Frame detection determines the symbol boundary so that the correct samples for a symbol frame can be taken. Due to the carrier frequency difference of the transmitter and receiver, each signal sample at time t contains an unknown phase factor where c f Δ is the unknown carrier frequency offset. This unknown phase factor must be estimated and compensated for each sample before FFT at the receiver since, otherwise, orthogonality between sub-carriers is lost. For example, when the carrier is at 5 GHz, an 100 ppm crystal offset corresponding to a frequency offset of 500 kHz. For a symbol period of T=3.2 μs, Δfc T=1.6.

The synchronized signal from the FFT processor 20 is input to the channel estimator and equalizer 21. The pilot signals are extracted to estimate channel response $H_{n,k}$ for the nth symbol in kth carrier.

An expected value $X_{n,k(pilot)}$ of the nth symbol in kth carrier for pilot is known. The actually received value $Y_{n,k(pilot)}$ of the nth symbol in kth carrier for pilot equals $X_{n,k(pilot)} \times H_{n,k(pilot)} + N_{n,k}$, where $N_{n,k}$ is the noise in the channel for the nth symbol in kth carrier. Thus, the channel response $H_{n,k}$ (pilot) for pilot is, first, derived by $Y_{n,k(pilot)}/X_{n,k(pilot)} + N'_{n,k}$, where $N'_{n,k}$ is a term resulting from the noise.

Then, time and frequency domain combined linear interpolation is implemented. The channel response $H_{n,k(data)}$ of the nth symbol in kth carrier for data is estimated by 2-D interpolation among channel responses $H_{n,k1(pilot)}$, $H_{n,k2(pilot)}$ $H_{n1,k(pilot)}$ and $H_{n2,k(pilot)}$ of pilots, where k1 and k2 are the orders of the pilots nearest to k in frequency domain, while n1 and n2 are the orders of the pilots nearest to n in time domain. Moreover, there may be weighting between time and frequency domain. Thus, the channel response $H_{n,k(data)}$ can be derived by the equation:

$$H_{n,k(data)} = \beta\left(\left|\frac{k-k_2}{k_2-k_1}\right||H_{n,k_1(pilot)}| + \left|\frac{k-k_1}{k_2-k_1}\right||H_{n,k_2(pilot)}|\right) + (1-\beta)\left(\left|\frac{n-n_2}{n_2-n_1}\right||H_{n_1,k(pilot)}| + \left|\frac{n-n_1}{n_2-n_1}\right||H_{n_2,k(pilot)}|\right)$$

Where β is the weighting between the time and frequency domain and ranges from 0 to 1. After the second step, only part of responses of channels for data is derived.

Third, a 1-D linear interpolation in frequency domain is implemented for the channels located in boundary. The boundary channels are those, having the same time index, located only between one pilot channel and one data channel which has been derived from the second step. The boundary channel response $H_{n,k(boundary)}$ of the nth symbol in kth carrier is estimated by interpolation between the response $H_{n,k1(pilot)}$ of the nearest pilot channel and the response $H_{n,k2(data,known)}$ of the nearest data channel. Thus, the boundary channel response $H_{n,k(boundary)}$ can be derived by the equation:

$$H_{n,k(boundary)} = \left|\frac{k-k_2}{k_2-k_1}\right||H_{n,k_1(pilot)}| + \left|\frac{k-k_1}{k_2-k_1}\right||H_{n,k_2(data,known)}|$$

Finally, a 1-D linear extrapolation in frequency domain is implemented for the rest channel response. The rest channel response $H_{n,k(data,unkown)}$ of the nth symbol in kth carrier is estimated by extrapolation using the responses of the nearest pilot channel and several nearest estimated data channels ($H_{n,k1(data,known)}$, $H_{n,k2(data,known)}$ and $H_{n,k3(data,known)}$, for example) between the two nearest pilot channels ($H_{n,k41(pilot)}$ and $H_{n,k42(pilot)}$). Thus, the responses $H_{n,k(data,unknown)}$ of the rest data channel can be derived by the equation (with the assumption that k42>k3>k2>k1>k41):

$$H_{n,k} = \begin{cases} \left|\frac{k-k_3}{\alpha(k_2-k_1)+k_3-k_{41}}\right||H_{n,k_{41}}| + \left|\frac{\alpha(k-k_2)}{\alpha(k_2-k_1)+k_3-k_{41}}\right||H_{n,k_1}| + \\ \left|\frac{\alpha(k-k_1)}{\alpha(k_2-k_1)+k_3-k_{41}}\right||H_{n,k_2}| + \\ \left|\frac{k-k_{41}}{\alpha(k_2-k_1)+k_3-k_{41}}\right||H_{n,k_3}|, \ldots k_2 > k > k_1 \\ \left|\frac{k-k_{42}}{\alpha(k_3-k_2)+k_{42}-k_1}\right||H_{n,k_1}| + \left|\frac{\alpha(k-k_3)}{\alpha(k_3-k_2)+k_{42}-k_1}\right||H_{n,k_2}| + \\ \left|\frac{\alpha(k-k_2)}{\alpha(k_3-k_2)+k_{42}-k_1}\right||H_{n,k_3}| + \\ \left|\frac{k-k_1}{\alpha(k_3-k_2)+k_{42}-k_1}\right||H_{n,k_{42}}|, \ldots k_3 > k > k_2 \end{cases}$$

Where α is a weighting coefficient.

A specific example described in the following shows an application of the channel estimation to a DVB-T receiver.

In a DVB-T system specified by ESTI standard, various cells within the OFDM frame are modulated with reference information whose transmitted value is known to the receiver. Cells containing reference information are transmitted at "boosted" power level. The information transmitted in these cells are scattered or continual pilot cells. Each continual pilot coincides with a scattered pilot every fourth symbol; the number of useful data carriers is constant from symbol to symbol; 1 512 useful carriers in 2K mode and 6 048 useful carriers in 8K mode. The value of the scattered or continual pilot information is derived from a PRBS (Pseudo Random Binary Sequence) a series of values, one for each of the transmitted carriers.

The continual and scattered pilots are modulated according to a PRBS sequence, $w_k$, corresponding to their respective carrier index k. This sequence also governs the starting phase of the TPS information.

The PRBS is initialized so that the first output bit from the PRBS coincides with the first active carrier. A new value is generated by the PRBS on every used carrier (whether or not it is a pilot).

The polynomial for the Pseudo Random Binary Sequence (PRBS) generator shall be $X^{11}+X^2+1$.

Reference information, taken from the reference sequence, is transmitted in scattered pilot cells in every symbol. Scattered pilot cells are always transmitted at the "boosted" power level. Thus the corresponding modulation is given by:

$$Re\{c_{m,n,k}\} = 4/3 \cdot 2(1/2 - W_k)$$

$$Im\{c_{m,n,k}\} = 0$$

Where m is the frame index, k is the frequency index of the carriers and n is the time index of the symbols.

For the symbol of index n (ranging from 0 to 67), carriers for which index k belong to the subset:

$$\{k = K_{min} + 3 \times (n \bmod 4) + 12p | p \text{ integer}, p \geq 0, k \in [K_{min}; K_{max}]\} \text{ are scattered pilots,}$$

Where p is an integer that takes all possible values greater than or equal to zero, provided that the resulting value for k does not exceed the valid range $[K_{min}; K_{max}]$.

Figure 2:
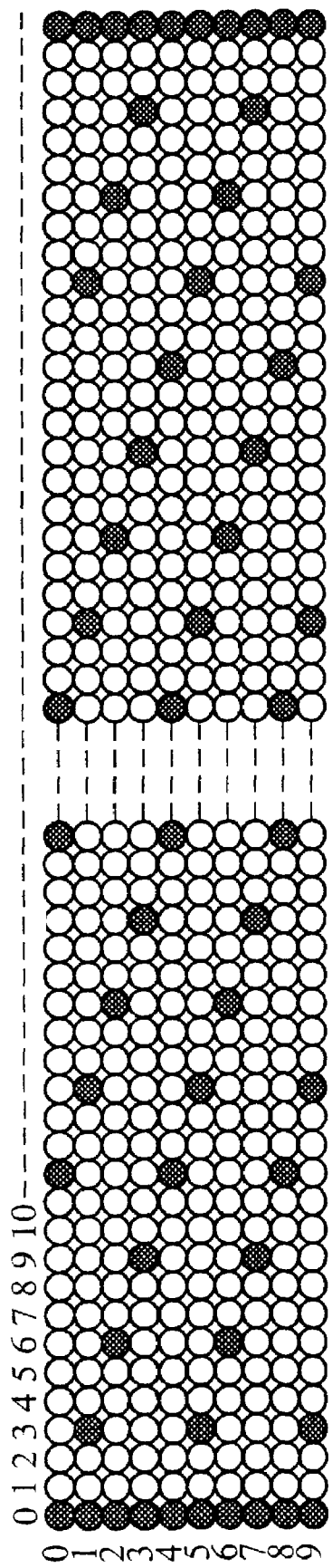
FIG. 2 is a diagram showing locations of the scattered pilots in the DVB-T system.

FIG. 2 is a diagram showing thus resulted locations of the scattered pilots in the DVB-T system. According to the second step of the channel estimation previously described in this embodiment, all the responses $H_{n,k}$ of the data channels wherein n is a multiple of 3 are estimated by 2-D interpolation among the responses $H_{n,k1}$, $H_{n,k2}$ $H_{n1,k}$ and $H_{n2,k}$ of the four nearest pilot channels. For example, If the β is chosen to be 0.5, the responses $H_{4,3}$, $H_{4,6}$ and $H_{4,9}$ of the data channels are derived by the equations:

$$H_{4,3} = \frac{3}{8}H_{4,0} + \frac{1}{8}H_{4,12} + \frac{1}{8}H_{1,3} + \frac{3}{8}H_{5,3}$$

$$H_{4,6} = \frac{1}{4}H_{4,0} + \frac{1}{4}H_{4,12} + \frac{1}{4}H_{2,6} + \frac{1}{4}H_{6,6}$$

$$H_{4,3} = \frac{1}{8}H_{4,0} + \frac{3}{8}H_{4,12} + \frac{3}{8}H_{3,9} + \frac{1}{8}H_{7,9}$$

Afterwards, the 1-D linear interpolation in the third step of the estimation in this embodiment is implemented for the boundary channels, for example, $H_{4,1}$ and $H_{4,2}$. The responses $H_{4,1}$ and $H_{4,2}$ of the boundary channels are estimated by interpolation between the response $H_{4,0}$ of the nearest pilot channel and $H_{4,3}$ of the nearest estimated data channel. Thus, the channel responses $H_{4,1}$ and $H_{4,2}$ are derived by the equations:

$$H_{4,1} = \frac{2}{3}H_{4,0} + \frac{1}{3}H_{4,3}$$

$$H_{4,2} = \frac{1}{3}H_{4,0} + \frac{2}{3}H_{4,3}$$

Finally, the previously described 1-D linear extrapolation is implemented for the rest data channels. The responses $H_{n,k(data,unkown)}$ of the rest data channels are estimated by extrapolation using the responses of the nearest pilot channel and three nearest estimated data channels between the two nearest pilot channels. For example, if the α is chosen to be 10, the responses $H_{4,4}$, $H_{4,5}$, $H_{4,7}$ and $H_{4,8}$ are derived by the equations:

$$H_{4,4} = \frac{5}{39}H_{4,0} + \frac{20}{39}H_{4,3} + \frac{10}{39}H_{4,6} + \frac{4}{39}H_{4,9}$$

$$H_{4,5} = \frac{4}{39}H_{4,0} + \frac{10}{39}H_{4,3} + \frac{20}{39}H_{4,6} + \frac{5}{39}H_{4,9}$$

$$H_{4,7} = \frac{5}{39}H_{4,3} + \frac{20}{39}H_{4,6} + \frac{10}{39}H_{4,9} + \frac{4}{39}H_{4,12}$$

$$H_{4,8} = \frac{4}{39}H_{4,3} + \frac{10}{39}H_{4,6} + \frac{20}{39}H_{4,9} + \frac{5}{39}H_{4,12}$$

After all the channel responses are estimated, the channel estimator and equalizer 21 perform frequency domain zero-forcing equalization of all the OFDM sub-carriers. The channel estimator and equalizer 21 output recovered signals.

Since the OFDM signals are encoded by a channel encoder in the transmitter to make them invulnerable to channel imperfections, there must be the channel decoder 22 in the receiver. The signal from the channel estimator and equalizer 21 is input to the channel decoder 22.

Certain voltages occur statistically more often than others. When converted to the frequency domain these frequently occurring voltages will translate into concentrations of energy at particular frequencies. Such energy concentrations are more likely to produce annoying visible or audible interference to other services than if the voltages are spread over a varying voltage range. Transport multiplex adaptation and randomization is implemented in the OFDM transmitter for energy dispersal to spread any possible concentration of energy at specific frequencies. Thus, in the OFDM receiver, a reverse operation "energy dispersal removal" must be performed. The signal from the channel decoder 22 is input to the energy dispersal removing circuit 23.

Figure 3:
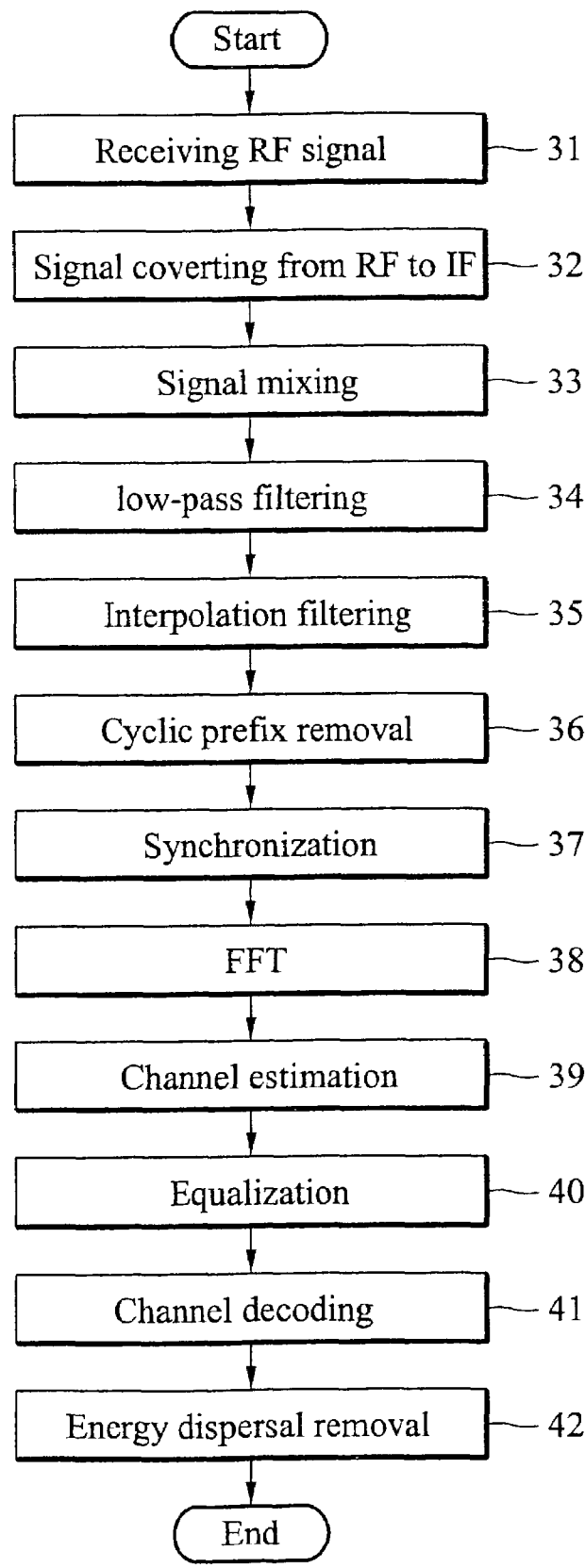
FIG. 3 is a flowchart of a method for processing a received OFDM signal according to one embodiment of the invention.
Figure 4:
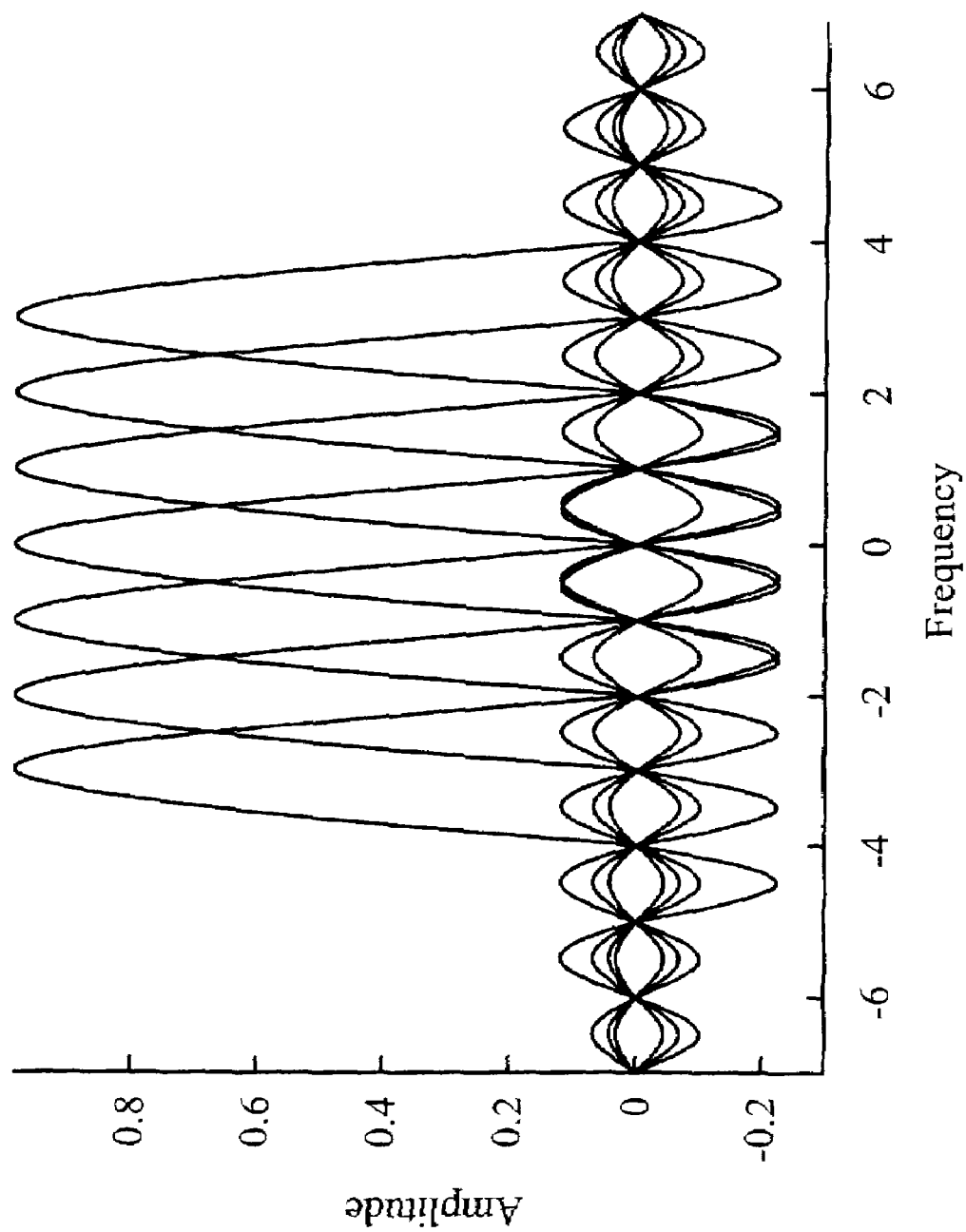
FIG. 4 is a diagram showing power spectral density of the OFDM signal.

FIG. 3 is a flowchart of a method for processing a received OFDM signal according to one embodiment of the invention.

In step 31, a radio frequency (RF) signal is received from an OFDM transmitter. The OFDM transmitter applies transport multiplex adaptation, randomization, channel coding, IFFT and cyclic prefix insertion to data signals, and uses multiple sub-carriers to transmit the data.

In step 32, the received RF input signal is converted in frequency to an intermediate frequency band (IF) signal and amplified.

In step 33, the analog IF signal is converted to a digital signal and combined with a frequency signal from a local oscillator (not shown) to be mixed down to baseband.

In step 34, since the baseband signal has signal components centered at 0 Hz and a high frequency twice the carrier frequency, a low-pass filter removes the signal components at the high frequency.

In step 35, the low-pass filtered baseband signal is further interpolation filtered to construct the signal at the correct sampling time. This is due to the sampling clock difference between the transmitter and receiver, which results in each signal sample deviates from its correct sampling time by a small amount, linearly increasing with the index of the sample.

In step 36, the cyclic prefix used to completely eliminate the inter-symbolic interference in the OFDM signal is removed before implementation of FFT.

In step 37, synchronization is implemented, usually consisting of frame detection, carrier frequency offset estimation and correction, and sampling error correction.

In step 38, FFT is implemented.

In step 39, channel estimation is implemented. The pilot signals are extracted to estimate channel responses. An expected value $X_{n,k(pilot)}$ of the nth symbol in kth carrier for pilot is known. The actually received value $Y_{n,k(pilot)}$ of the nth symbol in kth carrier for pilot equals $X_{n,k(pilot)} \times H_{n,k(pilot)} + N_{n,k}$, where $N_{n,k}$ is the noise in the channel for the nth symbol in kth carrier. Thus, the channel response $H_{n,k(pilot)}$ for pilot is, first, derived by $Y_{n,k(pilot)} \times H_{n,k(pilot)} + N_{n,k}$, where $N_{n,k}$ is a term resulting from the noise. Then, time and frequency domain combined linear interpolation is implemented. The channel response $H_{n,k(data)}$ of the nth symbol in kth carrier for data is estimated by 2-D interpolation among channel responses $H_{n,k1(pilot)}$, $H_{n,k2(pilot)}$ $H_{n1,k(pilot)}$ and $H_{n2,k(pilot)}$ of pilots, where k1 and k2 are the orders of the pilots nearest to k in frequency domain while n1 and n2 are the orders of the pilots nearest to n in time domain. Moreover, there may be weighting between time and frequency domain. After the second step, only part of responses of channels for data are derived. Third, a 1-D linear interpolation in frequency domain is implemented for the channels located in boundary. The boundary channels are those, having the same time index, located only between one pilot channel and one data channel which has been derived from the second step. The boundary channel response $H_{n,k(boundary)}$ of the nth symbol in kth carrier is estimated by interpolation between the response $H_{n,k1(pilot)}$ of the nearest pilot channel and the response $H_{n,k2(data,known)}$ of the nearest data channel. Finally, a 1-D linear extrapolation in frequency domain is implemented for the rest channel response. The rest channel response $H_{n,k(data,unkown)}$ of the nth symbol in kth carrier is estimated by extrapolation using the responses of the nearest pilot channel and several nearest estimated data channels between the two nearest pilot channels.

In step 40, frequency domain zero-forcing equalization of the OFDM sub-carriers is performed.

In step 41, channel decoding is applied to the recovered signal. Since the OFDM signals are encoded by a channel encoder in the transmitter to make them invulnerable to channel imperfections, channel decoding step must be performed.

In step 42, energy dispersal removal is performed. Many voltages occur statistically more often than others. When converted to the frequency domain these frequently occurring voltages will translate into concentrations of energy at particular frequencies. Such energy concentrations are more likely to produce annoying visible or audible interference to other services than if the voltages were spread over a varying voltage range. Transport multiplex adaptation and randomization is implemented in the OFDM transmitter for energy dispersal to spread any possible concentration of energy at specific frequencies. Consequently, a reverse operation "energy dispersal removal" must be performed.

In conclusion, the present invention provides an OFDM receiver, a processing method for received OFDM signal and particularly a channel estimation method for OFDM receiver. The channel estimation is 2-dimensional. That is to say, the responses for data channels are estimated by interpolation among known responses of pilot channels in time and frequency domain. Such a 2-dimensional channel estimation takes the channel variety in time into consideration. Thus, the OFDM receiver with such a channel estimator is suitable for both indoor and mobile reception.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for processing a RF OFDM signal transmitted from an OFDM transmitter, comprising:
   receiving and converting the RF OFDM signal into an IF OFDM signal;
   converting the IF OFDM signal into a digital OFDM signal;
   mixing down and synchronizing the digital OFDM signal to a baseband OFDM signal;
   removing cyclic prefix in the baseband OFDM signal;
   implementing FFT of the baseband OFDM signal wherein the cyclic prefix is removed;
   estimating channels of and equalizing the OFDM signal after FFT, which further comprises:
      deriving responses of pilot channels;
      deriving responses of first data channels by time and frequency domain combined linear interpolation among the responses of the pilot channels;
      deriving each response of boundary channels by frequency domain linear interpolation between the responses of the nearest pilot and first data channels;
      deriving responses of second data channels by frequency domain extrapolation using the responses of the pilot and first data channels; and
      equalizing sub-carriers by the responses of all the channels;
   applying channel decoding to the equalized OFDM signal; and
   removing energy dispersal from the OFDM signal after the channel decoding.

2. The method as claimed in claim 1, wherein an expected value $X_{n,k(pilot)}$ in the pilot channel of the nth symbol in kth carrier is known, the actually received value $Y_{n,k(pilot)}$ in the pilot channel of the nth symbol in kth carrier equals $X_{n,k(pilot)} \times H_{n,k(pilot)} + N_{n,k}$, where $N_{n,k}$ is the noise in the pilot channel for the nth symbol in kth carrier, and the response $H_{n,k(pilot)}$ of the pilot channel is derived by $Y_{n,k(pilot)}/X_{n,k(pilot)} + N'_{n,k}$, where $N'_{n,k}$ is a term resulting from the noise.

3. The method as claimed in claim 2, wherein the response $H_{n,k(data)}$ of the first data channel for the nth symbol in kth carrier is estimated by 2-D interpolation among the responses $H_{n,k1(pilot)}$, $H_{n,k2(pilot)}$, $H_{n1,k(pilot)}$ and $H_{n2,k(pilot)}$ of the pilot channels, where k1 and k2 are the orders of the pilots nearest to k in frequency domain while n1 and n2 are the orders of the pilots nearest to n in time domain.

4. The method as claimed in claim 3, further comprising a step of weighting the time and frequency domains.

5. The method as claimed in claim 3, wherein the boundary channels are those, having a same time index, located only between one of the pilot channels and one of the first data channels, and the response $H_{n,k(boundary)}$ of the boundary channel for the nth symbol in kth carrier is estimated by interpolation between the response $H_{n,k1(pilot)}$ of the nearest pilot channel and the response $H_{n,k2(data,known)}$ of the nearest first data channel.

6. The method as claimed in claim 5, wherein the response $H_{n,k(data,unkown)}$ of second data channel for the nth symbol in kth carrier is estimated by extrapolation using the responses of the nearest pilot channel and several nearest first data channels between the two nearest pilot channels.

7. A method for estimating channels of an OFDM signal comprising the steps of:
   deriving responses of pilot channels;
   deriving responses of first data channels by time and frequency domain combined linear interpolation among the responses of the pilot channels;
   deriving each response of boundary channels by frequency domain linear interpolation between the responses of the nearest pilot and first data channels; and
   deriving responses of second data channels by frequency domain extrapolation using the responses of the pilot and first data channels.

8. The method as claimed in claim 7, wherein an expected value $X_{n,k(pilot)}$ in the pilot channel of the nth symbol in kth carrier is known, the actually received value $Y_{n,k(pilot)}$ in the pilot channel of the nth symbol in kth carrier equals $X_{n,k(pilot)} \times H_{n,k(pilot)} + N_{n,k}$, where $N_{n,k}$ is the noise in the pilot channel for the nth symbol in kth carrier, and the response $H_{n,k(pilot)}$ of the pilot channel is derived by $Y_{n,k(pilot)}/X_{n,k(pilot)} + N'_{n,k}$, where $N'_{n,k}$ is a term resulting from the noise.

9. The method as claimed in claim 8, wherein the response $H_{n,k(data)}$ of the first data channel for the nth symbol in kth carrier is estimated by 2-D interpolation among the responses $H_{n,k1(pilot)}$, $H_{n,k2(pilot)}$ $H_{n1,k(pilot)}$ and $H_{n2,k(pilot)}$ of the pilot channels, where k1 and k2 are the orders of the pilots nearest to k in frequency domain while n1 and n2 are the orders of the pilots nearest to n in time domain.

10. The method as claimed in claim 9, further comprising a step of weighting time and frequency domains.

11. The method as claimed in claim 9, wherein the boundary channels are those, having a same time index, located only between one of the pilot channels and one of the first data channels, and the response $H_{n,k(boundary)}$ of the boundary channel for the nth symbol in kth carrier is estimated by interpolation between the response $H_{n,k1(pilot)}$ of the nearest pilot channel and the response $H_{n,k2(data,known)}$ of the nearest first data channel.

12. The method as claimed in claim 11, wherein the response $H_{n,k(data,unkown)}$ of second data channel for the nth symbol in kth carrier is estimated by extrapolation using the responses of the nearest pilot channel and several nearest first data channels between the two nearest pilot channels.

13. An OFDM receiver comprising:
an antenna receiving a RF OFDM signal;
a RF tuner converting the RF OFDM signal into an IF OFDM signal;
a A/D converter converting the IF OFDM signal into a digital OFDM signal
a digital mixer mixing down the digital OFDM signal to a baseband OFDM signal;
a cyclic prefix removing circuit removing cyclic prefix in the baseband OFDM signal;
a coarse synchronizer coupled between the cyclic prefix removing circuit and the digital mixer;
an FFT processor implementing FFT of the baseband OFDM signal wherein the cyclic prefix is removed;
a fine synchronizer coupled between the FFT processor and the digital mixer;
a channel estimator and equalizer receiving the OFDM signal from the FFT processor and comprising:
means for deriving responses of pilot channels;
means for deriving responses of first data channels by time and frequency domain combined linear interpolation among the responses of the pilot channels;
means for deriving each response of boundary channels by frequency domain linear interpolation between the responses of the nearest pilot and first data channels;
means for deriving responses of second data channels by frequency domain extrapolation using the responses of the pilot and first data channels; and
means for equalizing sub-carriers by the responses of all the channels;
a channel decoder applying channel decoding to the OFDM signal output from the channel estimator and equalizer; and
an energy dispersal removing circuit removing energy dispersal of the OFDM signal output from the channel decoder.

14. The OFDM receiver as claimed in claim 13, wherein an expected value $X_{n,k(pilot)}$ in the pilot channel of the nth symbol in kth carrier is known, the actually received value $Y_{n,k(pilot)}$ in the pilot channel of the nth symbol in kth carrier equals $X_{n,k(pilot)} \times H_{n,k(pilot)} + N_{n,k}$, where $N_{n,k}$ is the noise in the pilot channel for the nth symbol in kth carrier, and the response $H_{n,k(pilot)}$ of the pilot channel is derived by $Y_{n,k(pilot)}/X_{n,k(pilot)} + N'_{n,k}$, where $N'_{n,k}$ is a term resulting from the noise.

15. The OFDM receiver as claimed in claim 14, wherein the response $H_{n,k(data)}$ of the first data channel for the nth symbol in kth carrier is estimated by 2-D interpolation among the responses $H_{n,k1(pilot)}$, $H_{n,k2(pilot)}$ $H_{n1,k(pilot)}$ and $H_{n2,k(pilot)}$ of the pilot channels, where k1 and k2 are the orders of the pilots nearest to k in frequency domain while n1 and n2 are the orders of the pilots nearest to n in time domain.

16. The OFDM receiver as claimed in claim 15, further comprising a step of weighting time and frequency domains.

17. The OFDM receiver as claimed in claim 15, wherein the boundary channels are those, having a same time index, located only between one of the pilot channels and one of the first data channels, and the response $H_{n,k(boundary)}$ of the boundary channel for the nth symbol in kth carrier is estimated by interpolation between the response $H_{n,k1(pilot)}$ of the nearest pilot channel and the response $H_{n,k2(data,known)}$ of the nearest first data channel.

18. The OFDM receiver as claimed in claim 17, wherein the response $H_{n,k(data,unkown)}$ of second data channel for the nth symbol in kth carrier is estimated by extrapolation using the responses of the nearest pilot channel and several nearest first data channels between the two nearest pilot channels.

* * * * *